United States Patent Office 3,317,369
Patented May 2, 1967

3,317,369
ACRYLOXYALKYLSILANE COMPOSITIONS AND THE FABRICATION OF STRUCTURES THEREWITH
Harold A. Clark and Edwin P. Plueddermann, Midland, Mich., assignors to Dow Corning Corporation, Midland, Mich., a corporation of Michigan
No Drawing. Filed July 26, 1961, Ser. No. 126,885
30 Claims. (Cl. 161—193)

This invention relates to mixtures of acryloxyalkylsilanes with certain water-soluble binders, aqueous compositions prepared therefrom, base members (particularly siliceous materials) treated therewith, methods of fabricating improved composite structures containing the treated base members in combination with polymerizable materials having aliphatic unsaturation in the uncured state, and to the structure so fabricated. This application is a continuation-in-part of our copending application Ser. No. 101,383, filed Apr. 7, 1961, which is a continuation-in-part of our application Ser. No. 87,101, filed Feb. 6, 1961, both now abandoned.

As shown in the aforesaid copending application, treating base members with certain acryloxyalkyl substituted silanes brings about a great improvement in the bond obtainable between such members and various polymerizable materials. Especially important evidence of this effect is found in the higher strength of laminated and molded articles prepared in accordance with that invention, and in the greater retention of such strength after exposure to water. It has now been found that even better results can be obtained when the acryloxyalkylsilanes are employed in conjunction with certain alcohols, certain organic resins, certain other organosilanes, or combinations of these.

The preparation of the acryloxyalkylsilanes employed herein, techniques for their use, and descriptions of appropriate polymerizable materials having aliphatic unsaturation in the uncured state are set forth in detail in the aforesaid copending application, and the disclosure of that application is hereby incorporated by reference into the present application. It is to be understood that "acryloxy" is used herein as a term (or prefex) which is generic to and inclusive of the related "methacryloxy" compounds.

The acryloxyalkylsilanes of this invention in which the alkylene bridge between the acryloxy group and the silicon atom contains 2 to 4 carbon atoms (i.e., in which $n$ is 2, 3 or 4) can be prepared by an addition reaction between $HSi(OR')_3$ and the corresponding alkenyl acrylate or methacrylate. The following reactions of allyl acrylate, allyl methacrylate, and vinyl methacrylate are illustrative:

(1) $CH_2=CHCOOCH_2CH=CH_2 + HSi(OMe)_3 \rightarrow$
$CH_2=CHCOO(CH_2)_3Si(OMe)_3$
(2) $CH_2=C(Me)COOCH_2CH=CH_2 + HSi(OEt)_3 \rightarrow$
$CH_2=C(Me)COO(CH_2)_3Si(OEt)_3$
(3) $CH_2=C(Me)COOCH=CH_2 + HSi(OAc)_3 \rightarrow$
$CH_2=C(Me)COO(CH_2)_2Si(OAc)_3$ The above reactions are preferably carried out with the known platinum catalysts for such addition reactions, of which platinum deposited on alumina and chloroplatinic acid are the preferred species. Reaction temperatures in the region of 100° to 115° C. and chloroplatinic acid used in a concentration of about $1 \times 10^{-4}$ mole per mole of the unsaturated reactant are preferred. The $HSi(OR')_3$ reactants used above can be prepared by the reaction of $HSiCl_3$ with the corresponding alcohols or Cellosolves, or with sodium- or potassium acetate in the case of the triacetoxysilane.

An alternative technique for preparing the higher alkoxysilane products or those containing the Cellosolve —$CH_2CH_2OR'$ radicals is to carry out an ester interchange reaction between the methoxy-substituted product and the corresponding higher alcohol. Conventional techniques for ester interchange reactions with organosilicon compounds can be employed. Another alternative but related preparation lies in the use of $HSiCl_3$ rather than the $HSi(OR')_3$ compounds in the addition reaction. The same reaction conditions can be employed (although polymerization inhibitors such as copper acetate and hydroquinone should be used), and the adducts are the cholrosilanes of the general formula $$CH_2=CRCOO(CH_2)_nSiCl_3$$

The latter products can then be alkoxylated by reaction with the desired alcohol or Cellosolve to produce the compounds of this invention. The alkoxylation of organochlorosilanes is a well known reaction, and the conventional techniques can be used here. The chlorosilane adducts can also be converted to the corresponding acetoxy derivatives by reacting the chlorosilanes with sodium- or potassium acetate. Another technique for the preparation of the acetoxy derivatives is to react the trimethoxy-substituted product with acetic anhydride, distilling out the by-produced methyl acetate as it is formed.

The compounds of this invention can also be prepared by reacting a tertiary amine salt of acrylic or methacrylic acid (the organic radicals attached directly to nitrogen in said salt being alkyl radicals of from 1 to 4 inclusive carbon atoms) with a chloroalkylsilane of the formula $ClCH_2(CH_2)_xSi(OR')_3$, where $x$ is 0, 1, 2 or 3. It will be seen that the products of this invention wherein $n$ is 1 will be produced when $x$ in the above reactant is 0. Triethylamine is the preferred amine to form the reactant salt, and the salt as such does not necessarily have to be isolated. In other words, the amine and the chosen acid can be merely mixed, and the chloroalkylsilane added to the mixture in approximately stoichiometric quantities. Preferably the reaction is carried out in the presence of an inert organic solvent such as benzene, toluene, xylene, or cyclohexane, at reaction temperatures of about 100° to 150° C. It is also best to carry out the reaction in the presence of one or more polymerization inhibitors for acrylic or methacrylic acid, such as hydroquinone and N,N'-diphenylphenylene diamine. The reaction proceeds with the formation of the desired product $$CH_2=CRCOO(CH_2)_nSi(OR')_3$$

and the precipitation of the by-product tertiary amine hydrochloride. The chloroalkylsilane reactants can be prepared, for example, by the reaction of vinyl-, allyl-, or butenyl chloride with $HSi(OR')_3$, using chloroplatinic acid as the catalyst, or by the same reaction with $HSiCl_3$ followed by alkoxylation or acyloxylation of the chlorosilane adduct. The reactants of the formula $$ClCH_2Si(OR')_3$$

can be prepared by the chlorination of $MeSiCl_3$ to produce $ClCH_2SiCl_3$, followed by alkoxylation or acyloxylation of the latter.

A major facet of the present invention lies in the composition which comprises a mixture of
(A) at least one acryloxyalkylsilane of the formula $CH_2=CRCOO(CH_2)_nSi(OR')_3$ where R represents a substituent selected from the group consisting of the methyl radical and a hydrogen atom, $n$ is an integer of from 1 to 4 inclusive, and R' is selected from the group consisting of methyl, ethyl, isopropyl and acetyl radicals and radicals of the formula —$CH_2CH_2OR''$ where R" is an alkyl radical of from 1 to 4 inclusive carbon atoms, and (B) at least one binder selected from the group consisting of (1) a water-soluble alcohol having at least two hydroxy groups per molecule and having a melting point of at least 35° C.,
(2) an aqueous mixture of a film-forming organic resin which is miscible with water and which when dried is converted to a state which is not miscible with water,
(3) an organosilane of the formulae selected from the group $SiX_4$, where X is methoxy or $$[O(CH_2CH_2O)_mR'']$$

in which $m$ has a value from 1 to 2 inclusive and $R''$ is as above defined and $R'''_y Si(OR')_{4-y}$ where $R'$ is as above defined, $y$ is from 1 to 2 inclusive, and $R'''$ is selected from the group consisting of alkyl radicals of less than 4 carbon atoms, phenyl, vinyl, allyl, β-acetoxyethyl, and gamma-acetoxypropyl radicals, and radicals of the formula

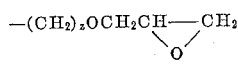

where $z$ is an integer from 2 to 3 inclusive, and
(4) boric acid.

The (A) component of the above mixture can be looked upon as a "coupling agent," for its action seems to be that of coupling with an unsaturated polymerizable material when the latter is applied to a surface which has been treated in accordance with this invention. The (B) components are designated "binders" herein because they provide a degree of bonding (in the sense of cohesiveness of slight tackiness) in materials treated with the defined composition. This is particularly important in the treatment of glass fibers as hereinafter described, where the binder acts to improve strand integrity for workability, i.e., the mechanical handling properties in the chopping, twisting, plying, or weaving of the glass fibers, etc., are improved. The defined binders also serve as a lubricant to prevent or decrease the weakening of fibers by abrasion against one another. The binders, particularly the boric acid and orthosilicates in B(3), serve to stiffen the treated fibers so the material can be more easily chopped. The effect of employing the (B) component in conjunction with the (A) component is not merely additive, however, for unexplainable synergistic effects are obtained with respect to the bond strength between treated base members and unsaturated resinous or rubbery materials polymerized in contact therewith, and with respect to the "wettability" of treated members by the unsaturated materials.

The proportions of (A) and (B) components in the above defined composition are not critical in the broadest aspects of the invention. Even minute amounts of (A) bring about a great improvement in properties as compared to the use of (B) alone, and thus the proportions will depend largely upon the nature of the properties desired in materials treated with this composition. Most of the compositions within the definition above will be in the form of true solutions, but many will take the form of emulsions, latices, and the like. The composition is therefore described as a "mixture," which term is used herein as inclusive of solutions, emulsions, and latices, as well as the rather waxy solid mixtures which can be obtained when the appropriate alcohol of (B)(1) is employed in the appropriate proportions. The composition will of course be in the nature of a latex if a (B)(2) component which is itself a latex is present.

It is generally preferable that the (A) component defined above the present in an amount of at least 2 percent by weight based on the weight of the total nonaqueous components of this composition. The "nonaqueous component" basis must be used because water is ordinarily an optional component, and it would necessarily be present where a (B)(2) component had been employed. Ordinarily no more than 99 percent of the (A) component will be present on this basis, and the most preferred range is from about 15 percent to 75 percent.

The composition as defined above is the most convenient and economical form for shipping and storing the material. In most cases, however, this composition will be diluted with water prior to its use. As shown in our aforesaid copending application, the acryloxyalkylsilanes which constitute the (A) component react with water to form a water-soluble hydrolyzate. The organosilanes defined in (B)(3) above also react with water to form a water-soluble hydrolyzate, in the manner shown in copending application 82,150, filed Jan. 12, 1961, now abandoned, and assigned to the assignee of the present invention.

In view of the fact that the described hydrolysis reactions do take place when the first defined compositions is dissolved in or diluted with water, a second form of the compositions of this invention can be defined as comprising a mixture of water, a water-soluble hydrolyzate of the defined acryloxyalkylsilane (A), and at least one of the above defined (B) components. If a (B)(3) type of component is present in this second form of the inventive composition, obviously it also will take the form of a water-soluble hydrolyzate of the corresponding organosilane. The water in this second form of the invention should be present in an amount at least sufficient to provide an homogeneous mixture of all of the components present, it being understood that "mixture" is again inclusive of solutions, emulsions, and latices. Any greater amount of water can be present, for the mixture is generally miscible in all proportions. More dilute mixtures must be applied in greater total quantity to provide a given amount of the nonaqueous components, so as a practical matter the mixture as used will ordinarily contain at least 0.1 percent by weight of those components. For most uses, dilution to about 0.5 to 15 percent of the nonaqueous components will be desirable.

In the preparation of water-soluble hydrolyzates from either the (A) or the (B)(3) organosilanes discussed above, the hydrolysis water is best employed at a pH of from 3 to 7 inclusive. At a pH of 7, however, a rather long time is required to reach the water-soluble hydrolyzate state, thus a pH of from 3.5 to 5 is preferred. Once the water-soluble state is reached, it is immaterial whether any water used for further dilution is on the acid side. Preferably the hydrolysis water is made mildly acidic with a water-soluble carboxylic acid such as acetic or propanoic acids. This aids in the hydrolysis of the (OR') groups, but does not bring about the more rapid and more complete condensation of silanol groups which will take place if a base or a stronger acid is used to expedite the hydrolysis. Such condensation is to be avoided because the resulting siloxanes and siloxanols will gel and precipitate out of the aqueous solution, i.e., the "shelf life" of the solution will be poor. In general, the best results are obtained by mixing the defined organosilanes with water which contains about 0.1 percent by weight of acetic acid. If desired, water-miscible solvents can be added to the aqueous solution to improve its shelf life and wetting characteristics.

The most preferred of the acryloxyalkylsilane components as defined in (A) above are those of the general formula $CH_2=CH_x(Me)_{1-x}COO(CH_2)_3Si(OMe)_3$ where Me is a methyl radical and $x$ is 0 or 1. It will be obvious that when $x$ is 1, the compound is an acryloxypropyl substituted material. When $x$ is 0, a methacryloxypropyl substituted product is designated.

The (B) components of the defined composition have the common property of being or forming material which is either solid at room temperature of which, if liquid, imparts a degree of tackiness or cohesiveness to base members treated therewith. The (B)(1) components are water-soluble alcohols having at least two hydroxy groups per molecule and having a melting point of at least 35° C. Examples of suitable alcohols include resorcinol (M.P.

110° C.), trimethylolethane (M.P. 202–204° C.), neopentyl glycol (M.P. of commercial product 110–127° C.), and polyalkylene glycols such as polyethylene glycol having an average molecular weight of from about 1000 (M.P. about 38° C.) up to about 9500. Preferably the alcohol has a waxy nature at room temperature and is one which would be compatible or miscible with whatever polymerizable material one is planning to use in contact with base members which have been treated with the defined composition.

The (B)(2) components are aqueous mixtures of film-forming organic resins which are miscible with water and which when dried are converted to a state which is not miscible with water. The term "mixture" is used to describe the aqueous (B)(2) components because their nature can vary from true solutions to dispersions, emulsions, or latices.

One preferred type of (B)(2) constitutes the materials which are commonly employed in latex form as binders for glass fibers. Such materials are well known, and can be generally described as latex binders made by the emulsion polymerization of at least one ethylenic monomer. Among such materials, polyvinyl acetate is most preferred. Other suitable monomers employed in emulsion polymerization to produce latex binders include the various acrylates (for example, methyl acrylate and methyl methacrylate) and copolymers thereof, and butadiene, vinylidene chloride, styrene, acrylonitrile, vinyl chloride, and chlorovinyl acetate, any of which can be used in any of their well known polymeric and copolymeric forms. Other typical binders for glass fibers which can be used here are known as the "chrome" finishes. These are complexes of the Werner type in which a trivalent nuclear chromium atom is coordinated with an acid such as methacrylic acid, a good example being the methacrylate-chromate chloride finish commercially available as "Volan."

The commercial binders for glass fibers as discussed above are often employed in conjunction with a wetting agent, and the inclusion of such agents is an optional variation of the present invention. These agents are generally cationic-active substances, as illustrated by cetyl or stearyl monoamine hydrochloride or acetate, dodecyl or hexadecyl amine and secondary and tertiary derivatives thereof such as dodecylmethylamine and its salts. Other satisfactory agents include the alkyl imidazoline derivatives, quaternary ammonium compounds such as trimethyl stearyl- or cetyl ammonium chlorides and bromides, and in general any of the amine compounds that dissociate in water to provide a positive radical containing a group of more than 8 (preferably 12 or more) carbon atoms. The latex binders and wetting agents discussed above are shown in greater detail in U.S. Patent No. 2,951,782, issued Sept. 6, 1960.

A good example of a film-forming organic resin of the (B)(2) type which is actually soluble in water is that known as a trimellitic alkyd resin. Such resins can be prepared from trimellitic acid or anhydride and a polyalcohol such as ethylene-, propylene-, butylene-, or neopentyl glycol. To improve toughness and flexibility, an aliphatic dicarboxylic acid is often included in the formulation. Acids used in conventional alkyds, such as adipic acid, are suitable for this purpose. Trimellitic anhydride is a commercially available material, and has the formula:

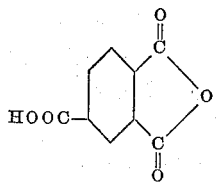

Typical water-soluble alkyd resins of the type in question include the reaction products of the following formulations, where molar quantities are expressed and "TMA" represents trimellitic anhydride:

(I)   1 TMA + 2 propylene glycol
(II)  5 TMA + 11 1,3-butylene glycol + 1 adipic acid
(III) 3 TMA + 7.7 ethylene glycol + 1 adipic acid
(IV)  3 TMA + 6.5 propylene glycol + 0.5 "Empol 1022" (Emery Industries, Inc.)
(V)   3 TMA + 7 neopentyl glycol + 1 adipic acid.

These alkyd resins are generally solubilized in water by adding a base (such as ammonia or an amine such as dimethyl ethanol amine) until the resin, which ordinarily will have an acid number in the range of about 40 to 60, is essentially neutral (i.e., pH of 6 to 7). Alkyd resins of this type have been described in "Water-Soluble Baking Resins From Trimellitic Anhydride," B. A. Bolton and R. E. Van Strien, American Paint Journal, June 20, 1960.

The (B)(3) components are organosilanes of the formulae

Si(OMe)$_4$, Si[OCH$_2$CH$_2$OR"]$_4$,
Si[OCH$_2$CH$_2$OCH$_2$CH$_2$OR"]$_4$, R'''$_y$Si(OR')$_{4-y}$ or their water-soluble hydrolyzates. In these formulae each R' is a methyl, ethyl, isopropyl, or acetyl radical or a radical of the formula —CH$_2$CH$_2$OR" where R" is an alkyl radical of 1 to 4 inclusive carbon atoms, and $y$ is 1 or 2. If desired, different R' radicals can be present in one compound. The R''' radicals can be alkyl radicals of less than 4 carbon atoms, phenyl, vinyl, allyl, β-acetoxyethyl (CH$_3$COOCH$_2$CH$_2$—), and gamma- acetoxypropyl (CH$_3$COOCH$_2$CH$_2$CH$_2$—) radicals or epoxy radicals of the formula

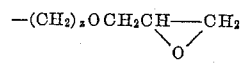

where $z$ is 2 or 3. Where more than one R''' radical is present on one silicon atom, the radicals can be the same or different. Most of the defined organosilanes are well known compounds. The epoxy substituted compounds can be prepared by the addition reaction of a suitable HSi(OR')$_3$ or HSiR'''(OR')$_2$ silane with vinyl- or allyl glycidyl ether in the presence of a platinum catalyst such as chloroplatinic acid, as shown in U.S. Patent No. 2,970,881, issued Feb. 7, 1961, or by the methods illustrated in the copending application Ser. No. 747,579, filed July 10, 1958, now abandoned, and assigned to the assignee of the present invention. Methoxy or ethoxy silanes are preferred as reactants, and products containing different (OR') groups can be obtained by an ester interchange reaction. The use of vinyl- or allyl acetate in place of the above glycidyl ethers will produce the corresponding acetoxyethyl and acetoxypropyl substituted compounds. HSiCl$_3$ can be used in place of HSi(OR')$_3$ as a reactant, followed by alkoxylation or acyloxylation of the resulting chlorosilane products to yield the desired —Si(OR')$_3$ compound. Either the —SiCl$_3$ or —Si(OR')$_3$ compounds can be reacted with an appropriate Grignard reagent to attach a hydrocarbon type of R''' radical to the silicon atom.

(B)(4) can be added to the mixture as boric acid or in the form of a hydrolyzable borate ester such as alkylborates in ethylborate, which will hydrolyze to produce boric acid in situ in the aqueous solutions. Another equivalent is boric oxide which reacts with water to form boric acid. Both the acids and the equivalent boron compounds which generate the acid in situ are within the scope of the claims.

It is to be understood that the (B)(1), (2), (3) and (4) components can be present in the composition either singly or in any combination. It is also possible to use two or more types of (B)(1) compounds without any (B)(2) or (3) compounds present, or two or more (B)(2) compounds without any (B)(1) or (3) present, or two or more (B)(3) compounds without any (B)(1) or (2) present, etc.

The compositions of this invention can be applied to various base members by any of the techniques described in our aforesaid copending application Ser. No. 101,383, including those applications in which unhydrolyzed silane components are permitted to hydrolyze and condense on the treated base member. The compositions are of most interest, however, in their aqueous mixture form, and the greatest utility has been found in the application of the aqueous form to siliceous materials, particularly to glass fibers. Thus another facet of this invention lies in a method of priming siliceous surfaces to improve their bonding to organic resins containing aliphatic unsaturation in the uncured state, which comprises wetting said surface with the defined aqueous mixture and then drying the surface so wetted.

The siliceous materials treated in accordance herewith can take a wide variety of forms (ranging through mica, asbestos, clay, vitreous enamel and ceramics, finely divided silica, etc.) as shown in our aforesaid copending application. Glass in sheet, fiber, or shaped forms is of prime interest, and the fiber forms include fine glass filaments and the numerous variations produced therefrom, e.g., yarn, roving, chopped strand, chopped roving, glass cloth, chopped strand mat, etc. If the glass fiber has already been treated with conventional organic sizes, finishes, or lubricants, best results are obtained if these are removed prior to carrying out a treatment in accordance with the present invention. Various techniques for "cleaning" glass fiber products of these organic materials are known, one of the most successful being the "heat cleaning" process in which the organic materials are literally burned away.

In one of the most preferred aspects of this invention, any need for cleaning the glass fiber is obviated by replacing the conventional size and/or lubricant, which is applied at the bushing during the drawing of the fine glass filaments, by the aqueous compositions of this invention. The defined compositions act as both a binder and lubricant in this forming operation, and produce a glass fiber which has far greater bond strength insofar as its bonding to aliphatically unsaturated polymerizable materials is concerned. Thus one of the articles of this invention can be defined as continuous glass fiber sized in forming with the defined aqueous composition to provide a thin film on the glass fiber surface. Various methods of applying size at the bushing are known (including roller applicators over which the freshly drawn glass fibers travel, felt pads saturated with the treating mixture and which are used to collect the individual filaments into a strand, fine mist sprays directed on the filaments, etc.) and any of these methods are suitable here.

When the defined compositions have been applied to a surface and the surface then dried, the silanols which are apparently present in the hydrolyzate of the acryloxyalkylsilane undergo condensation to provide a thin film of an organosiloxane which consists essentially of polymeric units of the formula $CH_2=CRCOO(CH_2)_nSiO_{1.5}$, where R and n are as previously defined. In the more preferred form of the invention, these units would have the formula $CH_2=CH_x(Me)_{1-x}COO(CH_2)_3SiO_{1.5}$ where x is 0 or 1. If a (B)(3) component was present in the treating mixture, the thin film coating on the treated article would also include an organosiloxane consisting essentially of units of the formula $SiO_2$[1] or $R'''_ySiO_{4-y/2}$ where R''' and y are as previously defined. The thin film coating will alternatively or additionally contain the (B)(1), (B)(2), or (B)(4) components if they are present in the treating mixture.

As noted previously, when an aqueous form of the composition is used in this invention, the concentration of nonaqueous components can vary over an extremely wide range, as, for example, from 0.1 to 90 percent or more. Optimum concentrations vary with the material being treated, the technique of application, and the properties being sought in the treated material. In the treatment of glass fiber at the bushing as the glass is being drawn, the aqueous compositions are best used at a concentration of from about 1 to 10 percent of the total nonaqueous components. When glass cloth is being treated by a dipping operation, a concentration of from about 0.25 to 1.5 percent of total nonaqueous components is generally sufficient. The hydrolyzable silanes used as starting materials will of course change their molecular structure due to the hydrolysis reaction, therefore it is to be understood that insofar as the organosilicon portion of the composition is concerned, the above mentioned concentrations are on the basis of the weight of unhydrolyzed monomeric silanes used in preparing the aqueous mixtures rather than the weight of the resulting hydrolyzates.

Any attempt to state an optimum pick-up of the nonaqueous components on base members broadly is meaningless because of the vast variation in the ratio of treated surface area to weight in the many diverse types of base members whose treatment is contemplated here. As applied to glass fiber, however, it is preferred that the amount of total material which ends up as a nonvolatile residue on the dried fiber glass be in the region of from about 0.1 to 3 percent by weight based on the weight of the glass fiber, and the best over-all results are generally obtained with a deposition of about 0.3 to 0.75 percent by weight. Of this total residue left on the glass, it is preferred that at least about 2 percent be the acryloxyalkyl siloxane of the unit formula $CH_2=CRCOO(CH_2)_nSiO_{1.5}$. This will vary with the total amount of residue on the glass, however, and where low total residues are involved it is preferred that a higher percentage of the total residue be the acryloxyalkyl siloxane. In general, it is preferred that the proportion of acryloxyalkylsiloxane in the total residue and the amount of total residue on the glass fiber be such that the weight of the acryloxyalkylsiloxane (calculated as such) on the glass is at least 0.01 percent by weight based on the weight of the glass, with the best results obtained in the region of from about 0.02 to 0.5 percent.

The films or coatings produced on base members by the treatment of this invention will generally be too thin to be visible, i.e., no obvious tangible film will be produced and in fact the film can range down to that of a monomolecular layer. If desired, however, a thick tangible layer can be obtained by using more concentrated forms of treating mixtures or by repeated applications. When the base member is a glass fiber product, usually only a thin film will be desired so that the handling characteristics of the fiber will not be unduly altered by the stiffening effect of a thick film.

A base member which has been treated or primed by being wetted with the defined compositions is preferably allowed to dry before the aliphatically unsaturated polymerizable material is brought into contact therewith. Drying can be carried out at ordinary room temperature, but it is usually preferred to expedite the process at elevated temperatures, 100° to 200° C. being a good workable range.

Polymerizable materials containing aliphatic unsaturation in the uncured state are a well known class of material, and the many examples which are shown in our aforesaid copending application are suitable in the present invention. Vinylic organic resins are of greatest interest here. The term "resin" is used in its conventional broader sense as being inclusive of materials which are not resinous in their uncured or monomeric state, so long as they are polymerizable to a resinous state. "Vinylic" is also used in a broad sense to embrace any polymerizable or copolymerizable compound containing the $$CH_2=C-$$

radical, i.e., a vinylic type group in a terminal position in the molecule. The preferred vinylic compounds are styrene, the acrylic and methacrylic resins, and butadiene-styrene copolymers. Unsaturated polyester resins are an-

---

[1] Hydrolyzate of the silanes $SiX_4$.

other preferred type of polymerizable material containing aliphatic unsaturation.

An outstanding example of the benefits obtainable from treating siliceous material in accordance with this invention is found in the preparation of laminates and the like from treated glass fiber and polyester resins. The improved bonding between the glass and the resin results in articles having greatly improved flexural and compressive strength, and greatly improved retention of such strength when the articles are exposed to water. This improvement in the properties of articles fabricated from polyester resins is sufficient to up-grade this relatively inexpensive type of resin so that it has properties equal to or better than those obtainable from the relatively expensive epoxy resins.

The preferred polyester resins can be defined as comprising an esterification product of an alpha-ethylenic, alpha, beta-dicarboxylic acid with a glycol, said product being an advanced linear polyester containing unesterified carboxyl groups and preferably having an acid number of from 5 to 100. As is well known, the linear polyester is ordinarily employed in admixture with a liquid monomeric unsaturated polymerizable compound, and hence the polyester should be miscible with and copolymerizable with said monomeric compound to yield a solid resinous material. Typical formulations of such mixtures range from 50 to 80 percent by weight of the polyester, and from 20 to 50 percent of the liquid monomeric compound. The liquid monomeric unsaturated compounds have the group $>C=C<$ in their molecular structure, and are exemplified by compounds such as styrene, vinyl toluene, alpha-methylstyrene, divinylbenzene, 2,4-dichlorostyrene, vinyl acetate, methyl methacrylate, ethyl acrylate, diallyl phthalate, diallyl succinate, diallyl maleate, acrylonitrile, methyl vinyl ketone, diallyl ether, methallyl alcohol, allyl crotonate, 1,3-chloroprene, butyl methacrylate, allyl acrylate, and triallyl cyanurate. Mixtures of two or more of these monomers can also be used.

The term "polyester resin" as used herein is intended to include the mixture of the linear polyester with the liquid monomeric unsaturated polymerizable compound as described above. The term also includes the polyester and the aforesaid mixture as conventionally used in conjunction with a polymerization catalyst and as used with other typical additives in such systems, as, for example, polymerization inhibitors or accelerators. Suitable catalysts, inhibitors, and accelerators are described in detail in our aforesaid copending application.

When any of the other aliphatically unsaturated polymerizable materials are brought into contact with the primed siliceous materials, they too are polymerized by any of the techniques and with any of the catalysts, inhibitors, or accelerators commonly used in the particular system.

Laminated articles comprising, in combination, a body of glass fiber which has been treated with the mixtures described above and dried, and one or more of the polymerized resins, constitute another facet of this invention. The unsaturated polyester resins are used in the preferred specie of such laminates.

The following examples are illustrative only. All parts and percentages mentioned are by weight unless otherwise indicated. The symbols Me, Et, i-Pr, Bu, Ph, and Ac have been used to represent methyl, ethyl, isopropyl, butyl, phenyl and acetyl radicals respectively.

*Example 1*

(A) A mixture of 1.5 g. PhMeSi(OMe)$_2$, 1.5 g. CH$_2$=C(Me)COO(CH$_2$)$_3$Si(OMe)$_3$, and 20 ml. of a solution of 0.1 percent acetic acid in water was agitated briefly to produce a homogeneous solution. The solution was diluted to 300 g. with additional 0.1 percent acetic acid and "112" glass cloth (i.e., "181" style glass cloth which had been heat cleaned) was dipped in the diluted solution. The cloth picked up about 61 percent of its weight of the solution. It was air-dried for one hour and then heated 7 minutes at 230° F. The pick-up of total siloxane "solids" on the cloth was 0.43 percent based on the weight of the dry, untreated cloth. Threads pulled from the edge of the treated cloth showed good strand integrity and excellent abrasion resistance, thus indicating that the treating solution imparted sufficient lubricity and cohesiveness to the fibers to be useful as a sizing for application at the bushing during the drawing of glass fibers.

A laminate was prepared containing 14 plies of the treated glass cloth (laid up with the warp threads rotated 90° in alternate plies) impregnated with a polyester resin, the laminate being cured 30 minutes at 15 p.s.i. and 100° C. to form a molded sheet having a thickness of about 135 mils and containing about 30 percent by weight of the cured polyester resin. The resin employed was a solution of 70 parts linear polyester in 30 parts of styrene monomer, to which had been added 0.5 part benzoyl peroxide dissolved in about 7.5 parts styrene monomer. The linear polyester in this resin mixture was one prepared from phthalic acid and maleic acid in equimolar proportions reacted with propylene glycol, the 70 percent solution of this polyester in styrene having an acid number of about 35. The flexural strength of this laminate was determined in accordance with the U.S. Federal Specification L-P 406b-Method 1031, and compressive strength was determined in accordance with Method 1021 of that specification. Flexural strength was also determined on a sample of the laminate which had been boiled in water for 2 hours and then wiped dry, this being a test which is recognized as roughly the equivalent of standing in water at room temperature for one month. Results from the latter test will be referred to hereafter as the "2 hr. Boil" data. The 2 hr. boil flexural strength times 100 divided by the strength of the laminate as molded is the "Percent Retention." The following results were obtained on the laminate prepared above, the strengths being reported in p.s.i.

Flexural strength _____ 85,800
2 hr. boil _____ 77,700
Percent retention _____percent__ 91
Compressive strength _____ 57,100

(B) Other specimens of "112" glass cloth were treated as described above except that PhSi(OMe)$_3$, EtSi(OMe)$_3$, or CH$_2$=CHSi(OMe)$_3$ respectively were used in place of the PhMeSi(OMe)$_2$ in the treating solution, and one part of each silane to two parts of $$CH_2=C(Me)COO(CH_2)_3Si(OMe)_3$$

was employed rather than the 1:1 ratio used in the first case. Laminates were prepared and tested in the same manner as above, with the following results:

|  | Additional Silane | | |
| --- | --- | --- | --- |
|  | PhSi(OMe)$_3$ | EtSi(OMe)$_3$ | CH$_2$=CHSi(OMe)$_3$ |
| Flex. Strength | 83,700 | 80,300 | 79,900 |
| 2 Hr. Boil | 75,600 | 74,800 | 71,000 |
| Percent Retention | 90 | 93 | 89 |
| Comp. Strength | 43,200 | 46,600 | 36,900 |

(C) For purposes of comparison, a laminate was prepared exactly as the first laminate above except that the heat cleaned glass cloth was used without any sizing treatment. Another laminate was prepared in the same manner, using heat-cleaned glass cloth which had been treated as above except that CH$_2$=CHSi(OMe)$_3$ (a "vinyl size") was used in the sizing solution in place of the $CH_2=C(Me)COO(CH_2)_3Si(OMe)_3$. The test results were as follows:

|  | No Size | Vinyl Size |
|---|---|---|
| Flexural Strength | 55,100 | 50,000 |
| 2 Hr. Boil | 34,800 | 51,500 |
| Percent Retention | 63 | [1] 103 |
| Compressive Strength | 32,100 | 29,300 |

[1] Indicates further curing took place in boiling water which more than offset loss of strength brought about by exposure to the water.

(D) A mixture of 1 g. of the acetoxypropyl silane $MeCOO(CH_2)_3Si(OMe)_3$ and 2 g.

$$CH_2=C(Me)COO(CH_2)_3Si(OMe)_3$$

was dissolved in 297 total grams of 0.1 percent acetic acid as in (A) above, and the dilute solution was used in the treatment of "112" glass cloth in the same manner as before to produce a treated cloth having a pick-up of 0.44 percent "solids." A mixture of 1.5 g. of the epoxy silane

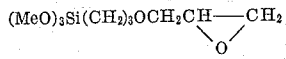

and 1.5 g. of the $CH_2=C(Me)COO(CH_2)_3Si(OMe)_3$ was diluted in the same way and a second specimen of the glass cloth was treated in the same manner with this second solution. Both glass cloths were made up into laminates as in (A) above, and the laminates showed the following properties:

|  | Additional Silane | |
|---|---|---|
|  | Acetoxy | Epoxy |
| Flexural Strength | 91,800 | 78,000 |
| 2 Hr. Boil | 83,300 | 73,500 |
| Percent Retention | 91 | 94 |
| Compressive Strength | 53,000 | 49,900 |

Example 2

A mixture was prepared containing 1.5 g. resorcinol and 1.5 g. $CH_2=C(Me)COO(CH_2)_3Si(OMe)_3$. It was dissolved in 297 g. of 0.1 percent acetic acid solution as in Example 1A, and "112" glass cloth was dipped in the solution and then dried and heated as in that example. The residue left on the glass (i.e., the pick-up of "solids") amounted to 0.51 percent of the dry glass weight.

Fibers pulled from the edge of the cloth showed that strand integrity and abrasion resistance were very good. A laminate was prepared from the cloth as in Example 1, and test results were as follows:

Flexural strength ........................... 85,800
2 hr. boil .................................. 78,300
Percent retention ........................... 91
Compressive strength ........................ 51,500

Example 3

A mixture of 2 g. $CH_2=C(Me)COO(CH_2)_3Si(OMe)_3$ and 1 g. of polyethylene glycol having an average molecular weight of 1450 was agitated with 20 ml of 0.1 percent acetic acid solution to produce a solution, the latter then diluted to 300 g. and "112" glass cloth treated therewith as in Example 1. The cloth picked up 0.51 percent "solids" on the glass. Another specimen of the glass cloth was treated in the same way except that neopentyl glycol was used in place of the polyethylene glycol, and the pick-up of "solids" was 0.50 percent. A third specimen of glass cloth was treated in the same way except that trimethylol ethane was used in place of polyethylene glycol, and the pick-up in this case was 0.52 percent solids. Excellent strand integrity and abrasion resistance were apparent in threads pulled from the edges of the treated cloths.

Laminates were prepared from each of the treated glass cloths, using the same method as in Example 1. Test results were as follows with respect to the different alcohols employed. (P.E.G., N.P.G., and T.M.E. are used to represent polyethylene glycol, neopentyl glycol, and trimethylol ethane respectively.)

|  | P.E.G. | N.P.G. | T.M.E. |
|---|---|---|---|
| Flexural Strength | 83,000 | 92,200 | 91,100 |
| 2 Hr. Boil | 83,400 | 89,200 | 81,100 |
| Percent Retention | 101 | 97 | 89 |
| Compressive Strength | 53,100 | 55,300 | 49,600 |

Example 4

(A) A solution prepared from 0.67 g. of $$CH_2=C(Me)COO(CH_2)_3Si(OMe)_3$$

and 199.33 g. of 0.1 percent acetic acid was mixed with 2.43 g. of a polyvinyl acetate (PVA) latex containing 55 percent solids and having a viscosity of 1447 cps. at that concentration. A piece of the "112" glass cloth was dipped in the mixture, then dried and heated as in Example 1. This cloth had a pick-up of 0.6 percent "solids" on the glass. Threads pulled from the edge of the cloth showed excellent strand integrity and wettability by polyester resins.

(B) A solution of 0.67 g. of $$CH_2=C(Me)COO(CH_2)_3Si(OMe)_3$$

in 20 g. of 0.1 percent acetic acid was diluted to 80 g. with water. A dispersion was prepared by diluting 2.43 g. of the latex used in (A) above with water to a final weight of 20 grams. The solution and dispersion were mixed, and the mixture was further diluted by adding 100 g. of a solution containing 0.2 g. of "Armeen T.D." (a fatty amine commonly used as a wetting agent and antistatic agent, marketed by Armour Chemical Company) to give a final mixture containing about 1 percent of the sizing solids. Glass cloth was treated with this mixture as in (A) above, and picked up 0.6 percent "solids."

(C) A control sample (PVA alone) was run by diluting 3.64 g. of the latex used in (A) to 200 grams final weight with water, thus giving a 1 percent dispersion of polyvinyl acetate. Glass cloth was treated with this dilute dispersion as in (A), and picked up about 0.6 percent "solids."

(D) Laminates were prepared from the three treated glass cloth specimens obtained above, using the same method as in Example 1. Test results on these laminates were as follows:

|  | A | B | PVA Alone |
|---|---|---|---|
| Flexural Strength | 93,200 | 87,200 | 58,400 |
| 2 Hr. Boil | 84,700 | 87,900 | 38,100 |
| Percent Retention | 91 | 101 | 65 |
| Compressive Strength | 51,700 | 47,000 | 28,300 |

Example 5

(A) 2.42 g. of a water solution containing 31 percent of a trimellitic alkyd resin (prepared from trimellitic anhydride, neopentyl glycol, and adipic acid in a 3:7:1 molar ratio and solubilized by neutralization with dimethyl ethanol amine, and having a viscosity of 9630 cps. at the 31 percent solids concentration) was diluted out to 180 grams dilute weight with water. This solution was mixed with 20 g. of a solution containing 0.75 g. of $CH_2=C(Me)COO(CH_2)_3Si(OMe)_3$ in 0.1 percent acetic acid, thus forming a solution containing 0.75 percent total sizing components, of which 50 percent was the silane component. A sample of "112" glass cloth was treated with the dilute solution as in Example 1, and had a pick-up of 0.4 percent total solids on the glass (i.e., about 0.145 percent of organosilicon solids calculated as the siloxane). Threads pulled from the edge had excellent strand integrity and were rapidly and thoroughly wet by polyester resin solutions.

(B) 6 g. of the 31 percent alkyd resin solution of (A) above was diluted to 180 grams weight with water, and to this was added 20 g. of a solution containing 0.1 g. $CH_2=C(Me)COO(CH_2)_3Si(OMe)_3$ in 0.1 percent acetic acid. This formed a solution containing 0.98 percent total sizing components, of which 5.1 percent was the silane component. A second sample of glass cloth was treated with this solution as before, and picked up 0.59 percent total solids on the glass (i.e., about 0.022 percent of organosilicon solids calculated as the siloxane).

(C) A control sample was prepared by treating glass cloth as before with a solution containing 0.666 percent of the trimellitic alkyd resin solids in water. The cloth picked up 0.4 percent solids.

(D) Laminates were prepared from the three treated glass cloths above by the method of Example 1. Test results were as follows:

|  | A | B | Control |
| --- | --- | --- | --- |
| Flexural Strength | 97,400 | 83,800 | 54,200 |
| 2 Hr. Boil | 90,100 | 71,700 | 30,600 |
| Percent Retention | 93 | 86 | 56 |
| Compressive Strength | 52,800 | 39,900 | 18,000 |

The above example illustrates the great changes in properties which can be brought about by an extremely minute amount of the acryloxyalkyl silane in the sizing or finishing solution.

*Example 6*

When the treating mixtures of Examples 1A and B, 2, 3, 4A and B, or 5A are adjusted to concentrations of from about 2 to 8 percent of total sizing components and applied by means of a roller applicator to glass fiber as it is being drawn from the bushing, the resulting filaments can be handled in conventional fashion to form strands, threads, and the like, which in turn can be dried and fashioned into roving, chopped strand, chopped roving, mats, glass cloth, etc. When any of these glass fiber products are incorporated into molding compounds, laminates, molded mats, and the like in which unsaturated polymerizable resins are employed, the glass reinforced products are much stronger than those prepared from untreated glass or from glass treated in accordance with the prior art techniques. The improvements are particularly outstanding with respect to products made from unsaturated polyester resins.

*Example 7*

(A) A mixture of 5 parts resorcinol and 10 parts $CH_2=C(Me)COO(CH_2)_3Si(OMe)_3$ was agitated into solution in 135 parts of 0.1 percent acetic acid, then diluted out with 1350 parts of additional 0.1 percent acetic acid. Heat-cleaned 60-end glass fiber roving was passed through the solution and then through a curing tower in which air was circulated at 250° F., the speed of passage being such that the roving was heated for about 2.5 minutes. The roving showed a pick-up of about 0.48 percent of its weight of total sizing solids. The roving was wound in parallel fashion around a metal frame in a manner to provide about 2.72 g. of glass per square inch. The assembly was impregnated with the polyester resin system of Example 1, and press molded 30 minutes at 30 p.s.i. and 100° C. The resulting laminate was cut away from the metal frame and cut into test specimens the length of which ran parallel to the direction of the glass roving. By ignition loss, the laminate was found to contain 27.5 percent resin.

(B) For purposes of comparison, a laminate was made as in (A) above from roving which had been treated in the same manner except that no resorcinol was present in the treating solution. This roving had a pick-up of 0.45 percent of the siloxane solids.

(C) For an additional comparison, a third laminate was prepared as in (A) above from glass roving treated in the same way except that a commercial sizing (i.e., "Garan" size, which is based on a vinylsiloxane) was used in place of the resorcinol-acryloxyalkylsilane mixture of (A).

(D) The three laminates prepared above were tested, and the following results obtained:

|  | A | B | C |
| --- | --- | --- | --- |
| Flexural Strength | 178,500 | 176,500 | 150,000 |
| 24 Hr. Boil | 168,500 | 147,300 | 93,500 |
| Percent Retention | 94 | 84 | 62 |

The improvement in A over B above shows the synergistic effect brought about by resorcinol with respect to bond strength. Resorcinol alone has no particular effect upon glass fiber in this matter. Typical properties of laminates prepared as in (A) above but using heat-cleaned roving which has not been treated in any manner are:

Flexural strength _____ 130,000
2 hr. boil _____ 57,100
Percent retention _____ 44

*Example 8*

When $CH_2=CHCOO(CH_2)_3Si(OMe)_3$ is substituted for the corresponding methacryloxypropyl substituted compound in Examples 1A and B, 2, 4A, or 5A, laminates prepared from glass cloth treated in accordance with those examples show comparable improvements in physical properties.

*Example 9*

(A) A mixture of 4 g. $PhMeSi(OMe)_2$, 4 g. allyltrimethoxysilane, 4 g. resorcinol, and 4 g.

$$CH_2=C(Me)COO(CH_2)_3Si(OMe)_3$$

was mixed with 16 g. methyl Cellosolve. A solution of 8 g. of this mixture in 32 g. 0.1 percent acetic acid was diluted to 400 grams final weight with additional 0.1 percent acetic acid, thus providing a solution containing 1 percent of total sizing components. Heat-cleaned glass cloth was dipped in the diluted solution, air dried overnight, then heated for 7 minutes at 230° F. A portion of the cloth was used in preparing a polyester laminate in the manner of Example 1, and test results showed:

Flexural strength _____ 91,800
2 hr. boil _____ 78,100
Percent retention _____ 85
Compressive strength _____ 50,000

(B) A second portion of the treated cloth was made up into a laminate in which an epoxy resin was employed as the resinous component. The resin used was a commercial one, marketed as "DER 331" by The Dow Chemical Company. DER 331 is a low molecular weight liquid epoxy resin prepared by the reaction of Bisphenol A and epichlorohydrin. It has a viscosity of 11,000–16,000 cps. and an epoxide equivalent weight of 187–193. The impregnation was carried out with material prepared by mixing 87 g. of acetone with 18.9 g. m-phenylenediamine as the catalyst, then dissolving 130 g. of the 100 percent solids resin in the acetone solution. After impregnating the cloth, it was air dried, then pre-cured 15 minutes at 110° C., then laid up in 14 alternating plies as in Example 1 and press molded for 30 minutes at 30 p.s.i. and 150° C. A control laminate was prepared in the same way from heat-cleaned glass cloth which had no sizing treatment. Test results on the two epoxy laminates were as follows:

|  | Treated | Control |
|---|---|---|
| Flexural Strength | 89,400 | 89,800 |
| 2 Hr. Boil | 79,200 | 65,300 |
| Percent Retention | 89 | 70 |
| Compressive Strength | 44,600 | 42,900 |

The improvement in wet strength of the epoxy laminate as illustrated above, taken with the strengths shown by the polyester laminate in (A), show that the formulation used in this example is an all-purpose type of finish or size which enables one to manufacture a single grade of glass fiber product which will give improved products in many different resin systems.

*Example 10*

When $CH_2=C(Me)COO(CH_2)_3Si(Oi-Pr)_3$ or the corresponding $-Si(OAc)_3$ and $-Si(OCH_2CH_2OMe)_3$ compounds or $CH_2=C(Me)COOCH_2Si(OMe)_3$ or $$CH_2=CHCOO(CH_2)_4Si(OEt)_3$$

are used in place of the $-Si(OMe)_3$ compound in the treatment described in Example 7, and laminates then prepared as described in that example, comparable improvements in the strength of the laminates are obtained.

Laminates have been shown in the above examples because they illustrate so well the improvement in bond strength between a siliceous material and a polymerizable unsaturated material which can be brought about by this invention. It will be obvious that the improvement in bond strength will be equally important in many other usages, as, for example, in treating sheets of glass which will be used in sandwich structures such as safety glass; in treating glass, ceramics, vitreous enamel surfaces and the like which are to be given protective or decorative coatings of paints, enamels, or varnishes containing unsaturated resins, in treating glass fiber textiles which are to be colored by pigments dispersed in unsaturated resins such as the acrylic latex pigment bonding systems conventionally used for that purpose; in treating silica, titania, alumina, iron oxide, and other metal oxide fillers, as well as mica asbestos, chopped glass, etc. to improve the reinforcement effect of such fillers in unsaturated resinous or rubbery articles; and in the treatment of metal surfaces such as steel, iron, and aluminum to improve the adhesion of protective and decorative coatings or of bodies of unsaturated resins and rubbers thereto.

*Example 11*

4 g. of

was mixed with 1 g. of $Si(OCH_2CH_2OMe)_4$. 1 g. of this mixture was then shaken with 9 g. of a .1 percent acetic acid in water solution until the silane dissolved. This solution was diluted to 200 g. with a .1 percent acetic acid in water solution and 1 square yard of 181 heat cleaned glass cloth weighing 247 g. was dipped into the solution. The cloth was removed and found to have picked up 156 g. of the solution. It was air dried and cured 7 minutes at 230° F.

The cloth so-finished had a substantially firmer hand than the cloth finished with the methoxysilane alone.

The cloth was laminated with a polyester resin in accordance with the procedure of Example 1 and the resulting laminates had the following properties:

Flexural strength _____ 74,600
2 hr. boil _____ 72,000
Percent retention _____ 97
Compressive strength _____ 45,000

*Example 12*

9.2 g. of a .1 percent acetic acid in water solution was mixed with .2 g. of boric acid and then mixed with .8 g. of

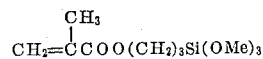

to give a homogeneous solution. The solution was then diluted to 200 g. with additional .1 percent acetic acid in water solution.

One square yard of 181 glass cloth weighing 246 g. was dipped into the diluted solution. It picked up 159 g. of the solution. The treated cloth had a firmer hand than when treated with the methoxysilane alone.

The treated cloth was air dried, cured 7 minutes at 230° F. and then laminated as shown in Example 1. The resulting laminates had the following properties:

Flexural strength _____ 79,600
2 hr. boil _____ 78,900
Percent retention _____ 99
Compressive strength _____ 52,500

*Example 13*

Equivalent results are obtained when the following orthosilicates are substituted for the orthosilicate of Example 11, tetramethoxysilane, $Si(OCH_2CH_2OC_4H_9)_4$, $Si(OCH_2CH_2OCH_2CH_2OC_2H_5)_4$.

That which is claimed is:

1. A composition comprising a mixture of
   (A) at least one acryloxyalkylsilane of the formula $CH_2=CRCOO(CH_2)_nSi(OR')_3$ where R represents a substituent selected from the group consisting of the methyl radical and a hydrogen atom, n is an integer of from 1 to 4 inclusive, and R' is selected from the group consisting of methyl, ethyl, isopropyl and acetyl radicals and radicals of the formula $-CH_2CH_2OR''$ where R'' is an alkyl radical of from 1 to 4 inclusive carbon atoms, and
   (B) at least one binder selected from the group consisting of
      (1) a water-soluble alcohol having at least two hydroxy groups per molecule and having a melting point of at least 35° C.,
      (2) an aqueous mixture of a film-forming organic resin which is miscible with water and which when dried is converted to a state which is not miscible with water,
      (3) an organosilane of the formulae selected from the group consisting of $SiX_4$, where X is selected from the group consisting of methoxy and $[O(CH_2CH_2O)_mR'']$ where m has a value from 1 to 2 inclusive and R'' is as above defined and $R'''_ySi(OR')_{4-y}$ where R' is as above defined, y is from 1 to 2 inclusive, and R''' is selected from the group consisting of alkyl radicals of less than 4 carbon atoms, phenyl, vinyl, allyl, β-acetoxyethyl, and gamma-acetoxypropyl radicals, and radicals of the formula

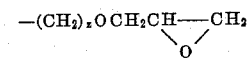

where z is an integer from 2 to 3 inclusive, and
      (4) boric acid.
2. A composition comprising a mixture of
   (A) a water-soluble hydrolyzate of an acryloxyalkylsilane of the formula $CH_2=CRCOO(CH_2)_nSi(OR')_3$ where R represents a substituent selected from the group consisting of the methyl radical and a hydrogen atom, n is an integer of from 1 to 4 inclusive, and R' is selected from the group consisting of methyl, ethyl, isopropyl and acetyl radicals and radicals of the formula $-CH_2CH_2OR''$ where R'' is an alkyl radical of from 1 to 4 inclusive carbon atoms, and
   (B) at least one binder selected from the group consisting of (1) a water-soluble alcohol having at least two hydroxy groups per molecule and having a melting point of at least 35° C.,
(2) an aqueous mixture of a film-forming organic resin which is miscible with water and which when dried is converted to a state which is not miscible with water,
(3) a water-souble hydrolyzate of an organosilane of the formulae selected from the group consisting of $SiX_4$, where X is selected from the group consisting of methoxy and $[O(CH_2CH_2O)_mR'']$ in which $m$ has a value from 1 to 2 inclusive and R'' is as above defined and $R'''_ySi(OR')_{4-y}$ where R' is as above defined, $y$ is from 1 to 2 inclusive, and R''' is selected from the group consisting of alkyl radicals of less than 4 carbon atoms, phenyl, vinyl, allyl, β-acetoxyethyl and gamma-acetoxypropyl radicals, and radicals of the formula $$-(CH_2)_zOCH_2CH\underset{O}{-\!\!-\!\!-}CH_2$$

where $z$ is an integer from 2 to 3 inclusive, and
(4) boric acid, and
(C) water in an amount at least sufficient to provide an homogeneous mixture of all of the components present.

3. A composition comprising an homogeneous aqueous mixture of
(A) a water-soluble hydrolyzate of an organosilane of the formula $$CH_2=CH_x(Me)_{1-x}COO(CH_2)_3Si(OMe)_3$$

where $x$ is an integer of from 0 to 1 inclusive and Me is a methyl radical, and
(B) at least one glass fiber binder selected from the group consisting of
(1) a water-soluble alcohol having at least two hydroxy groups per molecule and having a melting point of at least 35° C.,
(2) an aqueous mixture of a film-forming organic resin which is miscible with water and which when dried is converted to a state which is not miscible with water,
(3) a water-soluble hydrolyzate of an organosilane of the formulae selected from the group consisting of $SiX_4$ where X is selected from the group consisting of methoxy and $$[O(CH_2CH_2O)_mR'']$$

in which $m$ has a value from 1 to 2 inclusive and R'' is an alkyl radical of 1 to 4 inclusive carbon atoms and $R'''_ySi(OR')_{4-y}$ where R' is selected from the group consisting of methyl, ethyl, isopropyl and acetyl radicals and radicals of the formula $-CH_2CH_2OR''$ where R'' is an alkyl radical of from 1 to 4 inclusive carbon atoms, $y$ is from 1 to 2 inclusive, and R''' is selected from the group consisting of alkyl radicals of less than 4 carbon atoms, phenyl, vinyl, allyl, β-acetoxyethyl, and gamma-acetoxypropyl radicals, and radicals of the formula $$-(CH_2)_zOCH_2CH\underset{O}{-\!\!-\!\!-}CH_2$$

where $z$ is an integer from 2 to 3 inclusive and
(4) boric acid.

4. A composition comprising a mixture of an organosilane of the formula $$CH_2=CH_x(Me)_{1-x}COO(CH_2)_3Si(OMe)_3$$

where $x$ is an integer from 0 to 1 inclusive and Me is a methyl radical, and resorcinol.

5. A composition comprising a mixture of an organosilane of the formula $$CH_2=CH_x(Me)_{1-x}COO(CH_2)_3Si(OMe)_3$$

where $x$ is an integer from 0 to 1 inclusive and Me is a methyl radical, and a water-soluble polyethylene glycol having a melting point of at least 35° C.

6. A composition comprising a mixture of an organosilane of the formula $$CH_2=CH_x(Me)_{1-x}COO(CH_2)_3Si(OMe)_3$$

where $x$ is an integer from 0 to 1 inclusive and Me is a methyl radical, and neopentyl glycol.

7. A composition comprising a mixture of an organosilane of the formula $$CH_2=CH_x(Me)_{1-x}COO(CH_2)_3Si(OMe)_3$$

where $x$ is an integer from 0 to 1 inclusive and Me is a methyl radical, and trimethylolethane.

8. A composition comprising a mixture of an organosilane of the formula $$CH_2=CH_x(Me)_{1-x}COO(CH_2)_3Si(OMe)_3$$

where $x$ is an integer from 0 to 1 inclusive and Me is a methyl radical, and an organosilane of the formula $R'''_ySi(OR')_{4-y}$ where $y$ is an integer from 1 to 2 inclusive, R' is selected from the group consisting of methyl, ethyl, isopropyl and acetyl radicals, and radicals of the formula $-CH_2CH_2OR''$ where R'' is an alkyl radical from 1 to 4 inclusive carbon atoms, and R''' is selected from the group consisting of alkyl radicals of less than 4 carbon atoms, phenyl, vinyl, allyl, β-acetoxyethyl, and gamma-acetoxypropyl radicals, and radicals of the formula $$-(CH_2)_zOCH_2CH\underset{O}{-\!\!-\!\!-}CH_2$$

where $z$ is an integer from 2 to 3 inclusive.

9. A composition consisting essentially of a mixture of (1) an organosilane of the formula $$CH_2=CH_x(Me)_{1-x}COO(CH_2)_3Si(OMe)_3$$

where $x$ is an integer from 0 to 1 inclusive and Me is a methyl radical, (2) resorcinol, (3) an organosilane of the formula $PhMeSi(OMe)_2$ where Ph and Me represent phenyl and methyl radicals respectively, and (4) allyltrimethoxysilane.

10. An aqueous emulsion consisting essentially of water, a polyvinyl acetate latex, and a water-soluble hydrolyzate of an organosilane of the formula $$CH_2=CH_x(Me)_{1-x}COO(CH_2)_3Si(OMe)_3$$

where $x$ is an integer from 0 to 1 inclusive and Me is a methyl radical.

11. A composition consisting essentially of an aqueous solution of a water-soluble trimellitic alkyd resin and a water-soluble hydrolyzate of an organosilane of the formula $CH_2=CH_x(Me)_{1-x}COO(CH_2)_3Si(OMe)_3$ where $x$ is an integer from 0 to 1 inclusive and Me is a methyl radical.

12. A method for priming a siliceous surface to improve its bonding to organic resins containing aliphatic unsaturation in the uncured state, comprising wetting said surface with the mixture of claim 2 and then drying said surface.

13. A method for priming glass fiber to improve its bonding to unsaturated polyester resins which comprises wetting said glass fiber with the mixture of claim 3 and drying the glass fiber so wetted.

14. Continuous glass fiber sized in forming with the composition of claim 2 to provide a thin film on the glass fiber surface.

15. An article of manufacture comprising glass fiber coated with a thin film of both
(A) an organosiloxane consisting essentially of polymeric units of the formula $$CH_2=CH_x(Me)_{1-x}COO(CH_2)_3SiO_{1.5}$$

where $x$ is an integer of from 0 to 1 inclusive and Me is a methyl radical, and (B) a film forming material selected from the group consisting of
(1) a water-soluble alcohol having at least 2 hydroxy groups per molecule and having a melting point of at least 35° C.,
(2) an organic resin which is miscible with water in its partially polymerized state and which when dried is converted to a state which is not miscible with water,
(3) an organosiloxane consisting essentially of units of the formulae selected from the group consisting of $SiO_2$ and $R'''_y SiO_{4-y/2}$ where $y$ is an integer from 1 to 2 inclusive and $R'''$ is selected from the group consisting of alkyl radicals of less than 4 carbon atoms, phenyl, vinyl, allyl, β-acetoxyethyl, and gamma-acetoxypropyl radicals, and radicals of the formula $$-(CH_2)_zOCH_2CH\underset{O}{\overset{}{-\!\!\!-\!\!\!-}}CH_2$$

where $z$ is an integer from 2 to 3 inclusive and
(4) boric acid.

16. A process for bonding a polymerizable material containing aliphatic unsaturation in the uncured state to a siliceous surface which comprises priming said surface by wetting it with the mixture of claim 3 and drying the surface so wetted, contacting the primed surface so produced with the aforesaid polymerizable material, and polymerizing said polymerizable material.

17. In a process for treating fibrous glass material prior to the formation of a composite product with an unsaturated polyester resin, the improvement which comprises wetting the fibrous glass material with the mixture of claim 3, and drying said fibrous glass material.

18. A composition of matter comprising a mixture of a silane of the formula

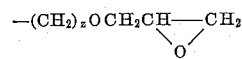

and a silane of the formula $Si[O(CH_2CH_2O)_mR'']_4$ in which $R''$ is an alkyl radical of 1 to 4 inclusive carbon atoms and $m$ has a value from 1 to 2 inclusive.

19. An aqueous solution of the hydrolyzates of both silanes of claim 18.

20. An aqueous solution of both boric acid and a hydrolyzate of

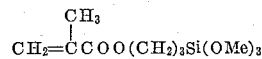

21. A glass article coated with a mixture of a hydrolyzate of

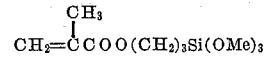

and boric acid.

22. A composition consisting essentially of an aqueous solution of the composition of claim 4.

23. A composition consisting essentially of an aqueous solution of the composition of claim 5.

24. A composition consisting essentially of an aqueous solution of the composition of claim 6.

25. A composition consisting essentially of an aqueous solution of the composition of claim 7.

26. A composition consisting essentially of an aqueous solution of the composition of claim 8.

27. A composition consisting essentially of an aqueous solution of the composition of claim 9.

28. A laminated article comprising a plurality of layers of glass fibers which have been treated by being wetted with the mixture of claim 2 and then dried, and then bonded together by a polymerized resin which prior to polymerization contained aliphatic unsaturation.

29. A laminated article comprising a plurality of layers of glass fibers which have been treated by being wetted with the mixture of claim 10 and then dried, and then bonded together by a polymerized resin which was unsaturated in its partially polymerized state.

30. A molded article comprising, in combination, a body of glass fiber which has been treated by being wetted with the mixture of claim 2 and then dried, and a polymerized resin which prior to polymerization contained aliphatic unsaturation.

References Cited by the Examiner
UNITED STATES PATENTS

| | | | |
|---|---|---|---|
| 2,390,370 | 12/1945 | Hyde | 117—126 |
| 2,403,872 | 7/1946 | Miller | 117—72 |
| 2,563,288 | 8/1951 | Steinman | 117—126 |
| 2,688,007 | 8/1954 | Steinman | 117—161 |
| 2,723,210 | 11/1955 | Biefeld | 117—126 |
| 2,780,909 | 2/1957 | Biefeld et al. | 117—126 |
| 2,798,020 | 7/1957 | Balz et al. | 117—126 |
| 2,799,598 | 7/1957 | Biefeld et al. | 117—126 |
| 2,823,218 | 2/1958 | Spier et al. | 260—46.5 |
| 2,842,521 | 7/1958 | Nitsche et al. | 117—161 |
| 2,851,439 | 9/1958 | Clark | 117—126 |
| 2,885,383 | 5/1959 | Brooks | 260—448.8 |
| 2,922,806 | 1/1960 | Merker | 260—448.8 X |
| 2,931,739 | 4/1960 | Marzocchi et al. | 117—126 |
| 2,946,701 | 7/1960 | Plueddemann | 117—126 |
| 2,951,772 | 9/1960 | Marzocchi et al. | 117—126 |
| 2,951,782 | 9/1960 | Eilerman | 117—72 X |
| 2,956,044 | 10/1960 | Merker | 260—46.5 |
| 2,958,114 | 11/1960 | Marzocchi et al. | 117—126 |
| 2,974,062 | 3/1961 | Collier | 117—126 |
| 2,994,619 | 8/1961 | Eilerman | 117—126 |
| 3,002,857 | 10/1961 | Stalego | 117—126 |

OTHER REFERENCES

Skiest, Epoxy Resins, Reinhold Publishing Corp., New York, 1958, p. 80.

ALEXANDER WYMAN, *Primary Examiner.*

JOSEPH B. SPENCER, *Examiner.*

P. H. KONDO, M. O. LITMAN, *Assistant Examiners.*

U.S. PATENT OFFICE
UNITED STATES PATENT OFFICE
CERTIFICATE OF CORRECTION

Patent No. 3317,369                    Dated: May 2, 1967

Harold A. Clark and Edwin P. Plueddemann

It is certified that errors appear in the above identified patent and that said Letters Patent are hereby corrected as shown below:

Col. 1, line 5   the name "Plueddermann" should read "Plueddemann"

Signed and sealed this 29th day of February 1972.

(SEAL)
Attest:

EDWARD M. FLETCHER, JR.                ROBERT GOTTSCHALK
Attesting Officer                       Commissioner of Patents